United States Patent [19]
Fukayama

[11] 3,938,195
[45] Feb. 10, 1976

[54] 8-TRACK - FAST FORWARD MECHANISM
[75] Inventor: Gary P. Fukayama, Roselle, Ill.
[73] Assignee: Motorola, Inc., Chicago, Ill.
[22] Filed: Sept. 26, 1974
[21] Appl. No.: 509,521

[52] U.S. Cl. .................... 360/93; 226/178; 360/73
[51] Int. Cl.² ................. G11B 15/28; G11B 15/48;
G11B 19/26; G11B 25/06
[58] Field of Search .......... 360/93, 73, 71, 72, 132;
242/55.19 A, 197–200; 226/178

[56] References Cited
UNITED STATES PATENTS

| | | | |
|---|---|---|---|
| 3,471,096 | 10/1969 | Hancock | 360/93 |
| 3,584,880 | 6/1971 | Ban | 360/93 |
| 3,602,650 | 8/1971 | Ban | 360/73 |
| 3,684,298 | 8/1972 | Ban | 360/73 |
| 3,800,320 | 3/1974 | Murakami | 360/93 |
| 3,821,807 | 6/1974 | Kawada et al. | 360/93 |

Primary Examiner—Alfred H. Eddleman
Attorney, Agent, or Firm—James W. Gillman; Donald J. Lisa

[57] ABSTRACT

A fast foward mechanism, for use in a magnetic tape player having a housing with an opening adapted to receive an exchangeable tape cartridge, includes a bracket mounted to the play capstan housing for providing support for a fast forward capstan. The bracket is movable between a first position wherein the fast forward capstan is disengaged from a drive motor when the cartridge is in the playing position against the play capstan, and a second position wherein the fast forward capstan is driven by the drive motor and is positioned to engage the magnetic tape in the cartridge when the cartridge is out of the play position. Control means operatively connected to the bracket is provided to move the fast forward mechanism between the first position and the second position to advance the magnetic tape in the cartridge.

9 Claims, 4 Drawing Figures

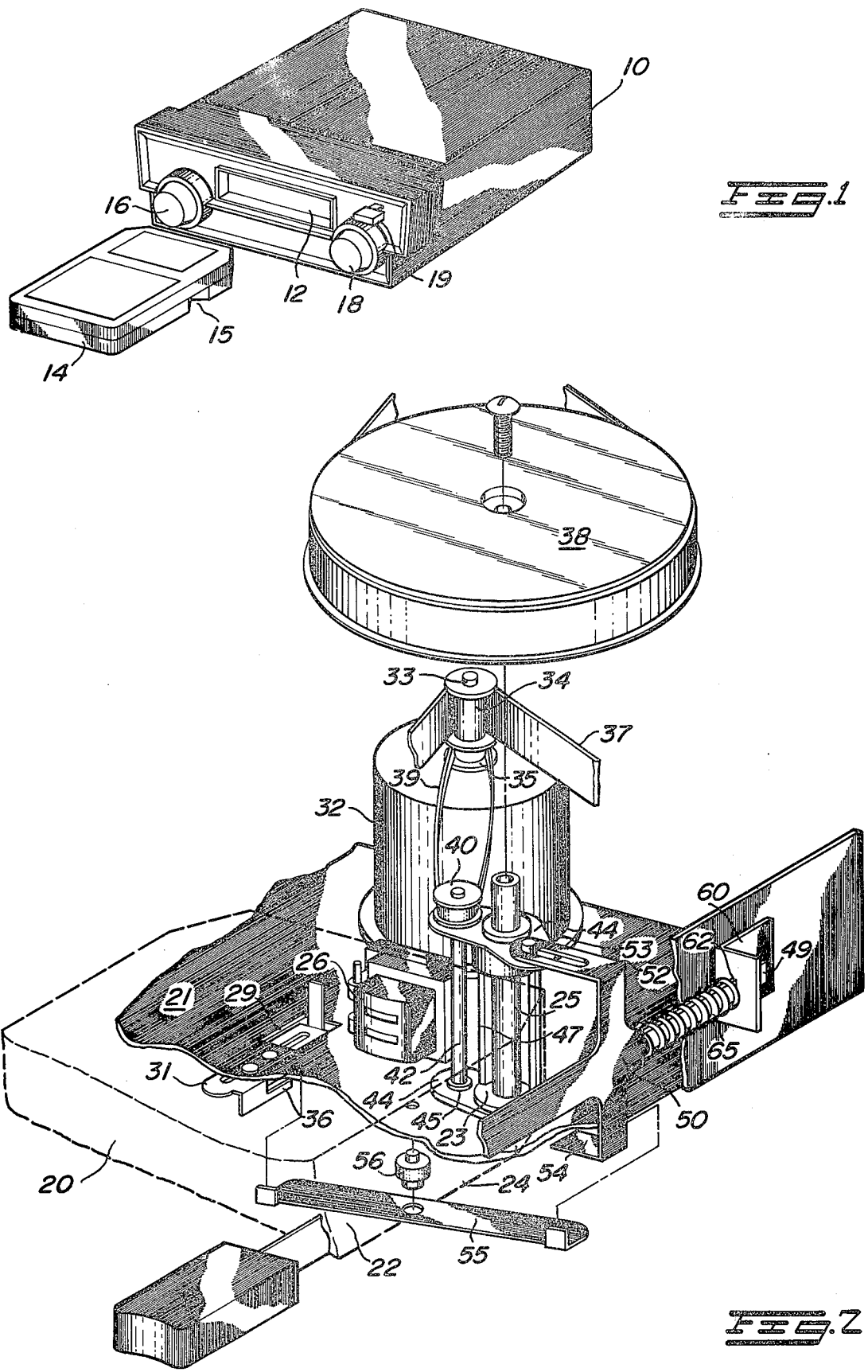

8-TRACK - FAST FORWARD MECHANISM

BACKGROUND OF THE INVENTION

In the operation of magnetic tape cartridge players adapted to receive an exchangeable cartridge having magnetic tape thereon, because the reverse of the endless magnetic tape cannot be effected, it is desirable to have a fast forward feed mechanism to provide rapid selection of the desired reproduction. Previous tape playing devices have utilized apparatus wherein the fast forward feed of the magnetic tape is attained by speeding up the rotational speed of the play capstan for driving the tape. Such devices may increase the speed of the drive motor for the purpose of speeding up the rotational speed of the capstan to effect fast forward of the tape within the cartridge. However, when the play capstan is driven at a speed which is substantially greater than the record speed, effectuating a fast forward movement of the tape, the flywheel coupled to the capstan tends to resist this change in rotational speed. The initial resistance of the flywheel to either an increase or a decrease in rotational speed requires the utilization of an expensive powerful motor capable of at least two rotational speeds and capable of rapidly accomplishing the change in rotational speeds. In such systems a problem is presented that if the flywheel is even slightly misaligned the rotation of the flywheel at high speeds can result in damaging vibrations which impair the efficiency of the tape drive mechanism.

Still other fast forward mechanisms utilize idler rollers engageable with the play capstan to effect the fast forward drive of the tape within the cartridge by rotating the play capstan at a higher speed. However, such structures are mechanically complicated, costly to manufacture and require precise manufacturing tolerances in order to obtain the desired result.

SUMMARY OF THE INVENTION

It is an object of this invention to provide a fast forward mechanism for use in a magnetic tape player adapted to receive an exchangeable cartridge.

Another object of this invention is to provide a fast forward mechanism for use in a magnetic tape cartridge player which utilizes a single speed drive motor for normal operation and to drive the fast forward capstan to advance the magnetic tape within the cartridge.

A further object of this invention is to provide a fast forward mechanism for use in a magnetic tape cartridge player wherein the fast forward capstan is provided to engage the magnetic tape when the cartridge is out of the play position to drive the same in a fast forward manner.

Briefly, a preferred embodiment of the fast forward mechanism according to the present invention includes a bracket mounted to the play capstan housing. The bracket pivots about the play capstan housing and includes a bearing housing for the fast forward capstan, which housing positions and holds the fast forward capstan parallel to the play capstan. The fast forward capstan includes a pulley mounted thereto which is connected by a belt to the drive motor. The drive motor includes a drive shaft which includes twin drive pulleys mounted thereto, one pulley connected by a drive belt with the flywheel attached to the play capstan and the other pulley connected by a drive belt to the fast forward capstan. The bracket is movable by a control arm between a first position wherein the fast forward capstan is disengaged from the drive motor when the cartridge is in the play position with the tape therein against the play capstan, and a second position wherein the cartridge is moved out of the play position and the fast forward capstan is positioned to engage the magnetic tape in the cartridge to advance the same, and the fast forward capstan is driven by the drive motor through the drive belt.

BRIEF DESCRIPTION OF THE DRAWINGS

FIG. 1 is a diagrammatic perspective view of a tape player utilizing the fast forward mechanism of this invention;

FIG. 2 is a perspective view in partial section of a portion of a magnetic tape player incorporating the fast forward mechanism according to the invention;

DETAILED DESCRIPTION

Figure 3:
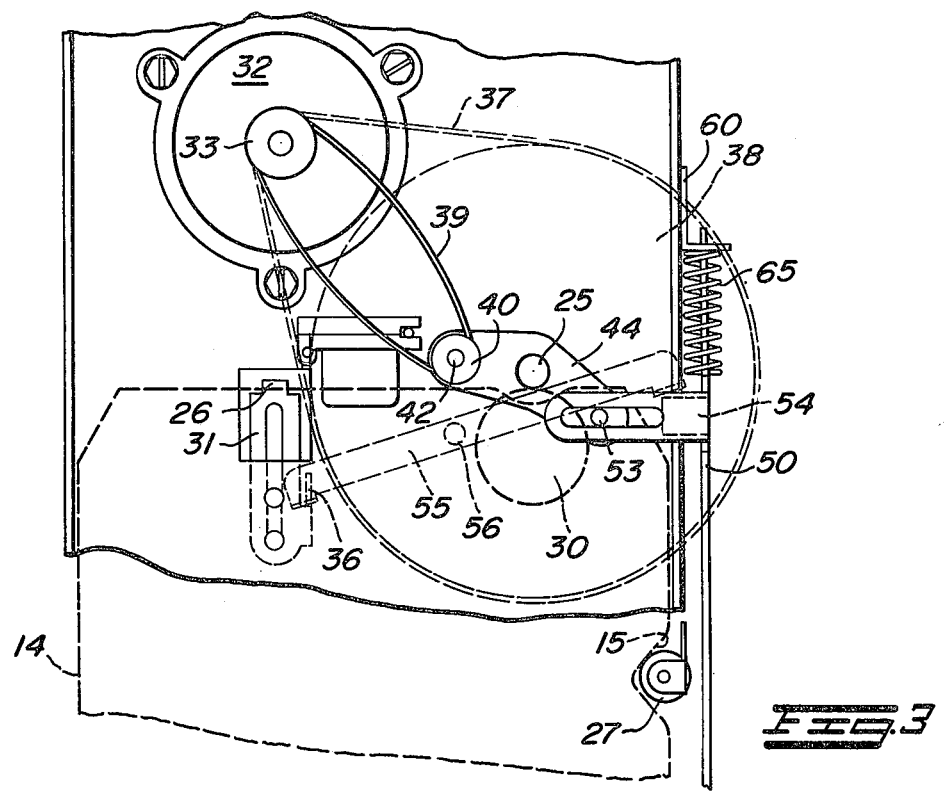
FIG. 3 is a top view of the fast forward mechanism when a cartridge is inserted into the tape player in playing position.

The fast forward mechanism of this invention has particular utility when used in conjunction with a magnetic tape player, particularly of the cartridge type. Referring now to FIG. 1, there is seen a magnetic tape player, designated generally by reference numeral 10, which includes a housing having an entryway 12 for receiving a cartridge 14. A quantity of endless tape is supported within the cartridge 14 and a magnetic head 26 (FIG. 2) is provided within the player 10, as is well known in the art. The cartridge 14 may include an indexing notch 15 which receives a camming wheel or roller mounted to a cartridge locking mechanism (not shown) preferably of the type disclosed in U.S. Pat. No. 3,485,500 issued on Dec. 23, 1969 and assigned to the same assignee as this application. Volume and tone controls 16 and 18, respectively, may be provided as necessary. Also, a fast forward control button 19 is provided at the front panel of the player.

As shown by FIG. 2, a cartridge receiving chamber 20 is formed within the magnetic tape player 10 by a sheet metal chassis 24 which includes a cartridge support member 21 having a side support wall 22. Mounted to the cartridge support member 21 is a capstan housing 23 which houses the play capstan 25 in a predetermined position with respect to the cartridge locking mechanism of the type disclosed in U.S. Pat. No. 3,485,500. A transducer head 26 is positioned on support member 21 to cooperate with the magnetic tape within the cartridge 14. Additionally, projecting through an opening 29 in support member 21 is a cartridge disengaging lever 31 slidably mounted to support member 21, which lever is engaged by the fast forward mechanism to disengage cartridge 14 from the playing position, as will hereinafter be described. When cartridge 14 is in the playing position, a cartridge or pinch roller 30 (FIG. 3) mounted within the cartridge holds the tape against the play capstan 25 to permit the play capstan to drive the tape at a predetermined speed.

A motor 32 having a shaft 33 extending outwardly therefrom is mounted to the support member 21. Coaxially mounted on the shaft 33 are twin drive pulleys 34 and 35, respectively. Drive pulley 34 is connected by drive belt 37 to flywheel 38 mounted to the capstan 25. Drive pullye 35 is selectively connected by drive belt 39 to the fast forward mechanism through a fast forward pulley 40, coaxially mounted with the fast forward capstan 42, as will hereinafter be described.

The fast forward mechanism of the present invention includes a pair of brackets or plates 44 connected together by bar 47 which are mounted to the capstan housing 23. The brackets 44 provide an upper and lower support for the fast forward capstan 42, which is mounted to the brackets by seating the fast forward capstan 42 in bearings 45 mounted in brackets 44. The bearings 45 support and hold the fast forward capstan 42 in a vertical aligned relationship with respect to the play capstan 25. The fast forward pulley 40 is selectively connected by drive belt 39 to drive pulley 35 on shaft 33 of motor 32. A guide bracket 60 mounted to side member 22 and having an opening 62 therein is adapted to receive and guide end portion 49 of a fast forward actuator arm 50 mounted in the housing 12. The fast forward actuator arm 50 extends outwardly from housing 12 and is attached to the fast forward control button 19 (FIG. 1). Spring means 65 is provided to bias actuator arm 50 to the outward at rest position. The actuator arm 50 includes an arm portion 52 mounted by pin 53 to operatively connect top bracket 44 to the fast forward control button 19 (FIG. 1). Actuator arm 50 includes also an ejector arm portion 54 which is engageable with pivot arm 55 mounted to support member 21 by fastener 56. Pivot arm 55 is engageable with ejector portion 36 of disengaging lever 31 to control the disengagement of cartridge 14 away from engagement with capstan 25, as will hereinafter be described.

In FIG. 3, a cartridge 14 has been inserted into the cartridge receiving chamber 20, such that the roller of the cartridge locking mechanism (not shown) engages the cartridge notch 15 to hold the cartridge 14 and the attendant cartridge pressure roller 30 against the capstan 25 in playing position, in a manner well known in the art. In such a case, the magnetic tape is pressed between the capstan 25 and pressure roller 30, the capstan being rotationally driven by drive belt 37 connecting drive pulley 34 of drive motor 32 with flywheel 38 to impart motion to the magnetic tape to drive the same across the transducer head 26. When the cartridge 14 is held in the playing position, the drive belt 39 selectively connecting the drive pulley 35 of motor 32 with the fast forward pulley 40 on the fast forward capstan 42 is slack such that the fast forward capstan is not rotating or being driven. Additionally, when the cartridge is in the playing position, the fast forward capstan 42 is positioned and held by brackets 44 such that the fast forward capstan does not engage the cartridge.

Figure 4:
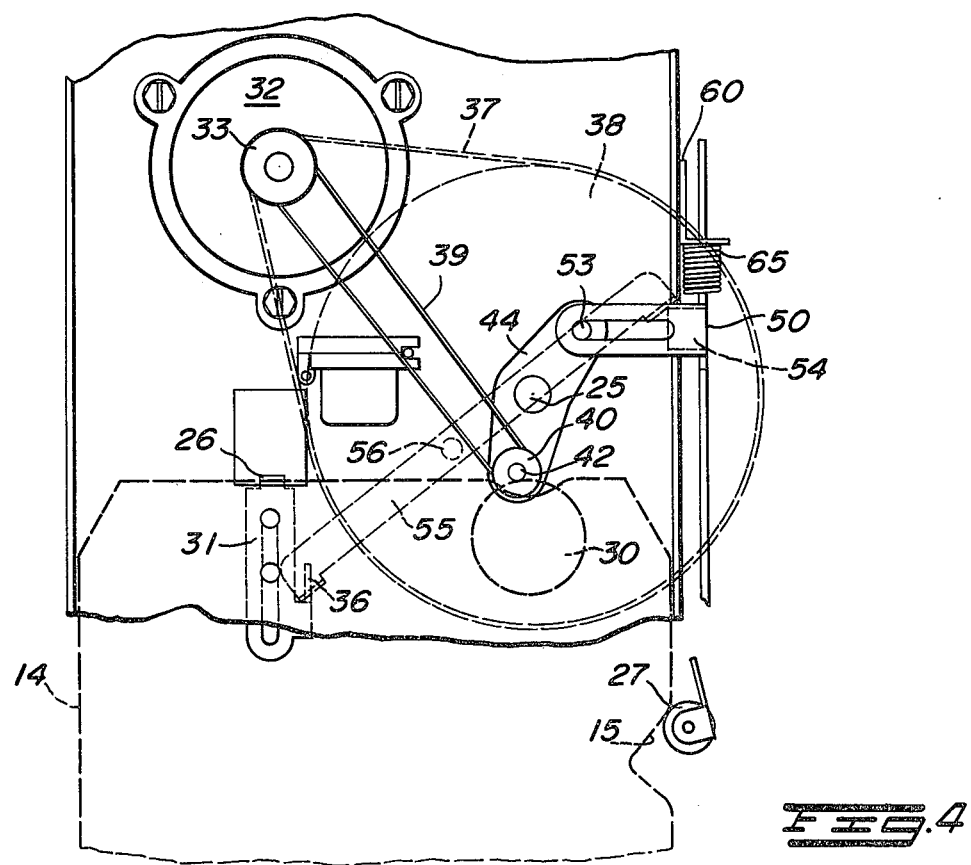
FIG. 4 is a top plan view showing the operation of the fast forward mechanism when the cartridge is out of the playing position and the fast forward mechanism is in operation.

When it is desired to advance the magnetic tape within cartridge 14 in a fast forward manner, the fast forward control button 19 is pushed inwardly thereby causing the fast forward actuator arm 50 and arm portion 52 to rotate bracket 44 about the capstan housing 23. The inward movement of actuator arm 50 causes ejector arm portion 54 to engage pivot arm 55 to rotate arm 55 about fastener 56. As pivot arm 55 rotates, it engages ejector portion 36 of disengaging lever 31 to move the lever 31 forwardly. As the disengaging lever 31 moves forwardly, it engages the cartridge locking mechanism, as is well known in the art, such that the cartridge 14 remains engaged in the player but is moved a predetermined distance from the play capstan. When the cartridge has been moved a predetermined distance, the rotation of bracket 44 about the capstan housing 23 positions and engages the fast forward capstan 42 with the magnetic tape in cartridge 14 between the fast forward capstan and pressure roller 30. At this point the slack in drive belt 39 connecting drive pulley 35 of drive motor 32 with the fast forward pulley 40 has been removed and the fast forward capstan 42 is rotationally driven by motor 32 to drive the magnetic tape in a fast forward manner, as illustrated in FIG. 4.

When it is desired to stop the fast forward movement of the magnetic tape in cartridge 14, control button 19 is released and spring means biases the actuator lever 50 to the outward at rest position. The outward movement of actuator lever 50 pivots bracket 44 and the fast forward capstan 42 away from the magnetic tape in cartridge 14 and provides slack in the drive belt 39 to disengage drive motor 32 from the fast forward pulley 40. Release of control button 19 permits the cartridge locking mechanism to return the cartridge 14 to its original play position against the play capstan, as is well known in the art.

Because the diameter of the fast forward pulley 40 is substantially less than the diameter of flywheel 38, the fast forward capstan 42 is driven at a rotational speed substantially greater than the rotational speed of capstan 25. Such an increased rotational speed permits the user of the magnetic tape player to advance the magnetic tape within the cartridge 14 at a tape speed of about ten times the normal speed of the tape when engaged by capstan 25. Importantly, the fast forward mechanism of the instant invention does not alter or interfere with the normal play operation of the magnetic tape player 10, with respect to the speed of operation of the play capstan 25 when the cartridge is in the playing position, because the fast forward mechanism operates independently of the tape drive mechanism. Consequently, the fast forward mechanism does not degrade wow or flutter characteristics, as takes place in many of the prior attempts to develop a fast forward mechanism in magnetic tape players.

I claim:

1. In a magnetic tape cartridge having a housing with an opening adapted to receive an exchangeable cartridge having magnetic tape thereon, and a transducer head positioned to be adjacent the tape in the cartridge for cooperating therewith, the combination including:

a play capstan mounted in the housing for engagement with a pressure roller in the cartridge to drive the magnetic tape past the transducer head, drive means mounted in the housing including a tape drive motor operatively connected to said capstan for rotating said capstan, fast forward means selectively engageable with said drive means, and having means adapted to engage the pressure roller in the cartridge to move the same, bracket means mounted in the housing for providing support for said fast forward means, said bracket means being movable between a first position wherein said fast forward means is disengaged from said drive means when the cartridge is in the play position against said capstan and a second position wherein said fast forward means is engaged by said drive means and said means thereof is positioned to thereby engage the pressure roller in the cartridge when the cartridge is out of the play position to advance the magnetic tape therein, and actuating means operatively connected to said bracket means to move the same between said first position wherein said fast forward means is disengaged from said drive means and said second position wherein said fast forward means is engaged by said drive means to advance the magnetic tape in the cartridge.

2. The magnetic tape player according to claim 1 further including disengaging means mounted in the housing for moving the cartridge a predetermined distance away from the play position against said play capstan.

3. The magnetic tape player according to claim 2 wherein said disengaging means includes a pivot arm mounted to the housing and a release lever engageable with the cartridge, said pivot arm being engageable with said actuating means and said release lever such that upon movement of said actuating means from said first position to said second position, said pivot arm is rotated to move said release lever thereby moving the cartridge a predetermined distance away from the play position against said capstan.

4. The magnetic tape player according to claim 1 wherein said drive means includes a tape drive motor having a shaft extending therefrom and first and second drive pulleys coaxially mounted therein, with said first pulley being coupled to said capstan and said second pulley being coupled to said fast forward means.

5. The magnetic tape player according to claim 1 wherein said means adapted to engage the magnetic tape in the cartridge includes a fast forward capstan.

6. The magnetic tape player according to claim 1 wherein said actuating means includes a control button and linkage means coupling said control button to said bracket means, said control button being movable to cause said linkage means to move said bracket means between said first and said second positions.

7. The magnetic tape player according to claim 1 wherein said bracket means includes first and second mounting plates each having bearings therein for receiving and holding the fast forward means in vertical aligned position with respect to said capstan.

8. The magnetic tape player according to claim 1 wherein said fast forward means includes a capstan having a pulley coaxially mounted thereto selectively engageable with said drive means.

9. In a magnetic tape cartridge player having a housing with an opening adapted to receive an exchangeable cartridge having magnetic tape thereon, and a transducer head positioned to be adjacent the tape in the cartridge for cooperating therewith, the combination including:

a capstan having a flywheel coaxially mounted thereto, a capstan housing mounted in the player housing for receiving and positioning said capstan for engagement with a pressure roller in the cartridge to drive the magnetic tape past the transducer head when the cartridge is in the play position against the said capstan, a drive motor mounted in the housing and having an armature and first and second drive pulleys coaxially mounted to said armature, said drive motor operatively connected to the flywheel for rotating said capstan, a fast forward capstan having a pulley coaxially mounted thereto, said pulley being selectively engageable with said drive motor for rotating said fast forward capstan with said fast forward capstan adapted to engage the pressure roller in the cartridge to move the magnetic tape, bracket means mounted in the housing for providing support for said fast forward capstan, said bracket means being movable between a first position wherein said fast forward capstan is disengaged from said drive motor when the cartridge is in the play position against said capstan and a second position wherein said fast forward capstan is engaged by said drive motor and said fast forward capstan is positioned to engage the pressure roller in the cartridge when the cartridge is out of the play position to advance the magnetic tape therein, and actuating means operatively connected to said bracket means for moving the same between said first position wherein said fast forward capstan is disengaged from said drive motor and said second position wherein said fast forward capstan is engaged by said drive motor to advance the magnetic tape in the cartridge.

* * * * *